US012222705B2

(12) United States Patent
Heindl et al.

(10) Patent No.: US 12,222,705 B2
(45) Date of Patent: Feb. 11, 2025

(54) SYSTEM AND METHOD FOR FACILITATING ENGINEERING OF AN INDUSTRIAL SYSTEM

(71) Applicant: SIEMENS AKTIENGESELLSCHAFT, Munich (DE)

(72) Inventors: Elisabeth Heindl, Cadolzburg (DE); Nataliia Rümmele, Munich (DE); Jörg Neidig, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/018,575

(22) PCT Filed: Jul. 7, 2021

(86) PCT No.: PCT/EP2021/068728
§ 371 (c)(1),
(2) Date: Jan. 29, 2023

(87) PCT Pub. No.: WO2022/022954
PCT Pub. Date: Feb. 3, 2022

(65) Prior Publication Data
US 2023/0297082 A1 Sep. 21, 2023

(30) Foreign Application Priority Data
Jul. 29, 2020 (EP) .................. 20188366

(51) Int. Cl.
G05B 19/00 (2006.01)
G05B 19/418 (2006.01)
(52) U.S. Cl.
CPC ..... G05B 19/4185 (2013.01); G05B 19/4187 (2013.01)

(58) Field of Classification Search
None
See application file for complete search history.

(56) References Cited

U.S. PATENT DOCUMENTS 6,735,578 B2 * 5/2004 Shetty ............... G06F 16/313
706/14
8,775,356 B1 * 7/2014 Chen ............... G06F 16/3338
706/50

(Continued)

FOREIGN PATENT DOCUMENTS

WO 2018081014 A1 5/2018

OTHER PUBLICATIONS

European Search Report for European Application No. 20188366.7-1213 mailed Jan. 15, 2021.

(Continued)

Primary Examiner — Farhan M Syed
(74) Attorney, Agent, or Firm — Lempia Summerfield Katz LLC

(57) ABSTRACT

System and method for facilitating engineering of an industrial system (250) are disclosed. The method comprising: generating a query (306) based on at least one of a user input and a user interaction with a Graphical User Interface (GUI) configured to enable engineering of the industrial system (250); mapping the query (306) to a knowledge database (140, 240) comprising engineering-data generated across multi-disciplinary platforms associated with at least one of design, engineering, commissioning, operation and maintenance of the industrial system (250), wherein the engineering-data is made available by one or more crawlers (122, 222-228) associated with the multi-disciplinary platforms and wherein the engineering-data is indexed in the knowledge database (140, 240) based on an engineering ontology of the industrial system (250); and displaying a notification (116, 172) on the GUI with a response the query (306), (Continued)

consequent to at least one of the user input and the user interaction, wherein the response comprises at least a list (174) of engineering-data related to the query (306), wherein the notification comprises at least recommendation to further engineering of the industrial system (250).

14 Claims, 4 Drawing Sheets

(56) References Cited

U.S. PATENT DOCUMENTS

| | | | |
|---|---|---|---|
| 9,208,223 B1* | 12/2015 | Patil | G06F 16/2291 |
| 10,157,347 B1* | 12/2018 | Kasturi | G06F 16/3326 |
| 2015/0006519 A1* | 1/2015 | Jain | G06F 40/30 |
| | | | 707/723 |
| 2016/0132572 A1* | 5/2016 | Chang | G06F 40/30 |
| | | | 707/723 |
| 2017/0351226 A1 | 12/2017 | Bliss | |
| 2017/0357730 A1* | 12/2017 | Bullis | G06F 16/3323 |
| 2018/0225382 A1 | 8/2018 | Crabtree et al. | |
| 2019/0294732 A1* | 9/2019 | Srinivasan | G06F 16/907 |
| 2020/0065680 A1* | 2/2020 | Cheng | G06F 16/951 |
| 2020/0074334 A1* | 3/2020 | Karanam | G06N 5/022 |
| 2020/0117758 A1* | 4/2020 | Lu | G06F 16/9538 |
| 2022/0245467 A1* | 8/2022 | Mukherjee | G06F 16/2228 |
| 2023/0177076 A1* | 6/2023 | Sharma | G06F 16/3329 |
| | | | 707/769 |

OTHER PUBLICATIONS

PCT International Preliminary Examination Report and Written Opinion of International Examination Authority mailed Jun. 24, 2022 corresponding to PCT International Application No. PCT/EP2021/068728.

PCT International Search Report and Written Opinion of International Searching Authority mailed Oct. 20, 2021 corresponding to PCT International Application No. PCT/EP2021/068728.

* cited by examiner

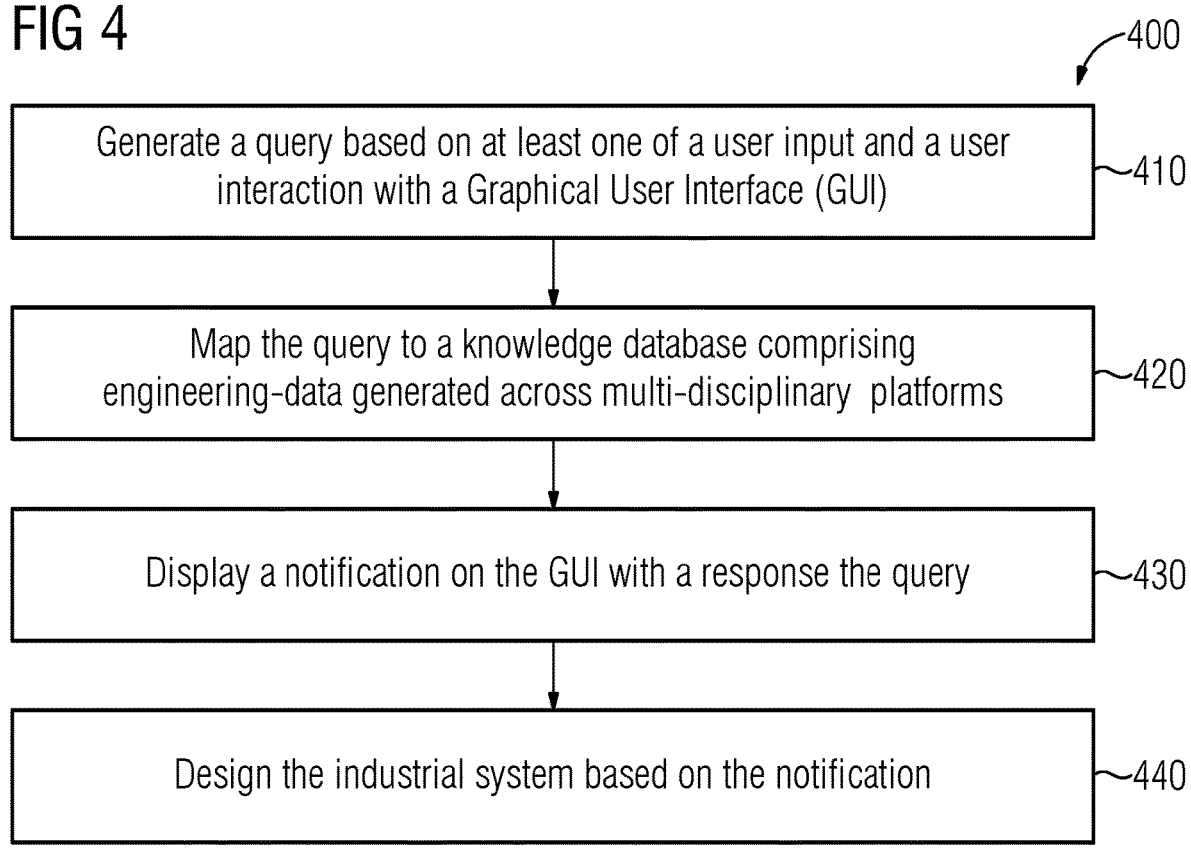
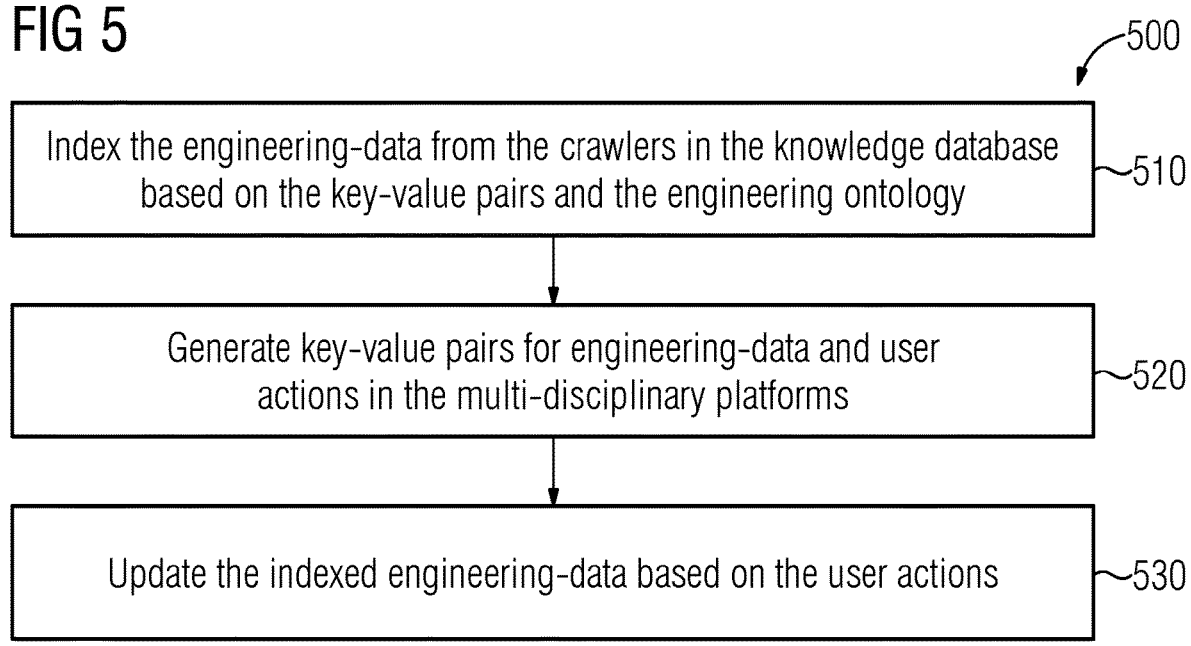

SYSTEM AND METHOD FOR FACILITATING ENGINEERING OF AN INDUSTRIAL SYSTEM

This application is the National Stage of International Application No. PCT/EP2021/068728, filed Jul. 7, 2021, which claims the benefit of European Patent Application No. EP 20188366.7, filed Jul. 29, 2020. The entire contents of these documents are hereby incorporated herein by reference.

BACKGROUND

The present embodiments relate to engineering of industrial systems and particularly to facilitating engineering of industrial systems with information from diverse engineering sources.

An engineer who designs, develops, or implements complex industrial systems may often find use for information from very different sources. Typically, the engineer searches through the sources manually. Manual search effort may be time consuming and inefficient.

For example, the engineer uses an engineering software to work on actions or projects related to an industrial system. The engineer may be interested in also identifying the hardware properties of a new engineering project from an online catalog located in the internet or in a second engineering software. In some cases, the second engineering software may have different access methods or may need additional credentials for access.

Further, the engineer may look at the sources that are already known to him/her. With industrial systems, there may be multiple sources of engineering data that may be relevant. However, correlating the engineering data across different sources may be cumbersome. With multiple engineering software, the protocols and syntax used in the individual software may make the correlation challenging.

Accordingly, methods and systems that facilitate engineering of the industrial systems may benefit from improvement. Particularly, there is a need to facilitate the engineer with engineering data from different source to enable effective design and engineering of the industrial system.

SUMMARY AND DESCRIPTION

The scope of the present invention is defined solely by the appended claims and is not affected to any degree by the statements within this summary.

The present embodiments may obviate one or more of the drawbacks or limitations in the related art. For example, systems and methods for facilitating engineering of an industrial systems is provided. For example, the method includes: generating a query based on a user input and/or a user interaction with a graphical user interface (GUI) configured to enable engineering of the industrial system; mapping the query to a knowledge database including engineering-data generated across multi-disciplinary platforms associated with design, engineering, commissioning, operation, and/or maintenance of the industrial system, where the engineering-data is made available by one or more crawlers associated with the multi-disciplinary platforms and where the engineering-data is indexed in the knowledge database based on an engineering ontology of the industrial system; and displaying a notification on the GUI with a response the query, consequent to at least one of the user input and the user interaction, where the response includes at least a list of engineering-data related to the query, where the notification includes at least recommendation to further engineering of the industrial system.

In another example, a system for facilitating engineering of an industrial system is provided. The system includes a crawler platform configured to communicate to one or more crawlers associated with multi-disciplinary platforms capable of performing design, engineering, commissioning, operation and maintenance of the industrial system; an indexing module communicatively coupled to the crawler platform configured to collate engineering-data mined by the crawlers in a knowledge database, the indexing module including an index reader configured to map a query to the engineering-data generated across the multi-disciplinary platforms based on an engineering ontology of the industrial system; and a user interface module configured to generate the query based on at least one of a user input and a user interaction with a graphical user interface (GUI) configured to enable engineering of the industrial system, where the GUI displays a notification on the GUI with a response the query, consequent to at least one of the user input and the user interaction, where the notification includes at least suggestions to further engineering of the industrial system.

Yet another example includes a computer program product, including computer readable code, that when executed on a processor, performs any one of the method steps of one or more of the methods herein.

The present embodiments disclose an artificial intelligence system that is configured to determine relevant resources and locate associated engineering data. Accordingly, the artificial intelligence system is configured to facilitate an engineer with recommendations of the engineering actions that may be suitable, or the next action in the current engineering process. The present embodiments also provide that the AI system build a knowledge base of the engineering data to support the engineer. Accordingly, the AI system provides that seamless correlation between engineering systems and information on the internet is built.

The technical effect of the present embodiments is that the engineer is supported by a tool that facilitates the engineering by answering questions that results from day to day engineering work. The advantage of sharing additional information regarding a project or task is reached by the combination of the analysis techniques based on artificial intelligence and the data providing infrastructure that is described herein.

Before describing the suggested convention in more detail, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments. It should also be appreciated that features explained in the context of the suggested method may also be comprised by the suggested system by appropriately configuring and adapting the system and vice versa.

As used herein "industrial system" refers to a facility that for manufacture, production that may be semi or completely automated. The technical system may be part of an automation environment. For example, such an automation environment may be an industrial automation environment, laboratory automation environment, building automation environment and the like. Further, according to the present embodiments, automation environment may include a combination of one or more industrial automation environments, factory automation environments, laboratory automation environments, building automation environments.

As used herein "multi-disciplinary platform" refers to one or more multi-disciplinary engineering software tools that allows engineers from multiple disciplines to work on common or connected engineering-data. The multi-disciplinary platform may also be referred to as a plurality of engineering software associated with the industrial system. For example, in a factory setting, a factory planner may work together with a mechanical engineer, an electrical engineer, and an automation engineer to plan a new production line for a car door assembly. When an automation engineer introduces a new programmable logic controller (PLC) to a project, this information is stored as engineering-data in the knowledge base. For example, the multi-disciplinary platform receives user inputs and actions computer aided design (CAD) software. The multi-disciplinary platform includes engineering software related to electrical, mechanical, process technology, software, and other subordinate elements from different engineering disciplines.

The term "facilitating engineering" refers to any prompt, suggestion, recommendation, notice, or the like whereby the engineer is able to design, configure, commission, collaborate, and complete day to day engineering action associated with the industrial system. The engineer may be prompted by a graphical user interface (GUI). In an embodiment, the engineer is prompted using a wearable device using known techniques in augmented reality.

In an embodiment, the method includes generating the knowledge database with the engineering-data and user actions performed in the multi-disciplinary platforms. The crawlers associated with the engineering software of the multi-disciplinary platform is used to monitor and index the user actions. The engineering-data and the user actions are indexed in the knowledge database according to the engineering ontology. Ontology based engineering enables capture of knowledge in an interoperable manner. Accordingly, the present embodiments provide interoperability of the knowledge database by using engineering ontology.

As used herein, "engineering ontology" refers to a formal conceptualization of the knowledge underlying the industrial system and automation engineering in general. The ontologies provide definitions of concepts and relations between the engineering-data. The engineering ontology may be built based on existing ontological standards for a domain. For example, IEEE 1872-2015 Standard Ontologies for Robotics and Automation (IEEE-SA, 2015), which establishes a series of ontologies about the Robotics and Automation. In another example, Ontology for Industry 4.0 (0414) is dedicated to capture the Industry 4.0-specific domain concepts.

In an embodiment, the knowledge database may be generated by generating key-value pairs for the engineering-data and the user action. For example, unstructured data in the engineering-data and the user actions may be analyzed by extracting the entities referenced in the user actions and by tokenizing text in the unstructured data. By analyzing the unstructured data, the present embodiments map unstructured information to formal concepts that are query-able. Further, by identifying the entity/entities associated with the unstructured data, a link between existing information in the knowledge database and the unstructured data is created. This link may be used to index the unstructured data in the knowledge database.

In an embodiment, the knowledge database is a knowledge graph database and/or ontology-based database. The method of generating the knowledge database may further include indexing the engineering-data from the crawlers in the knowledge graph based on key-value pairs and the engineering ontology and updating the indexed engineering-data based on the user actions. The key-value pairs may be generated between entities identified in the engineering-data and the engineering-data. The knowledge graph database may provide description of the engineering-data along with the engineering-data. Accordingly, the knowledge graph database may serve as a single place to find and understand the engineering-data. Using the engineering ontology-based indexing with knowledge graph database enables integration of entities in Industry 4.0 while mapping standards and standardization frameworks. Further, the extraction of entities from the unstructured data provides accessibility of the engineering-data stored in the knowledge graph database.

The generation of the knowledge database may serve as a basis on which the engineer is facilitated with engineering recommendations. The method may also include additional steps to analyze the user input or the user interaction to streamline mapping with the knowledge database. As used herein, "user input" refers to an action performed by a user or caused to be performed such as inputting a question about the industrial system, or a parameter of the industrial system or uploading a file associated with the industrial system Accordingly, in an embodiment, the method may further include recognizing at least one entity in the industrial system associated with the user interaction based on parameters of the industrial system associated with the user interaction, wherein the entity includes one or more hardware components and/or software components of the industrial system. The method may also include recognizing the entity in the industrial system associated with the user input based on analysis and synthesis of content of the user input, where the content includes text, image, audio, video, gesture, and a combination thereof. For example, the analysis and synthesis of the content of the user input may be performed using artificial intelligence techniques. The AI techniques are used to identify the type of the search query (e.g., navigational, informational, or transactional). A navigational query may relate to questions about the project (e.g., "where is the code for air pressure check?"). An informational query may relate to questions about comprehensive information about the used products (e.g., "configuration parameters for 4DI DC24V HF"). A transactional query may relate to recommendations for user interactions (e.g., "where to buy a controller for automation").

The technical effect of the AI based interpretation is to re-phrase the engineer's search request (e.g., user input). For example, the user input may be in the form of a text string. The text string is converted to the query over the index of the knowledge database. For example, the knowledge database is implemented as an ElasticSearch, and the user input is represented as a query Domain Specific Language (DSL).

In an example, the AI techniques include natural language processing. In an embodiment, the method may include recognizing the entity associated with the user input by interpreting the user input using natural language processing. The natural language processing is used to understand the engineer's request. For example, the natural language process is used for entity recognition techniques to identify relevant entities and concepts in the request.

The method may include determining, from the knowledge database, the engineering-data related to the entity referenced in the query. In an embodiment, the query generated based on AI interpretation is mapped to the engineering-data based on the entity. The entity acts like a reference point between the query and the knowledge database. The engineering-data related to the entity in the query is short-listed/identified as the related engineering-data and put in the list. The list may have a single related engineering-data or a plurality.

The method may further include determining a distance between the related engineering-data and the query based on a number of ontological hops between the query and the related engineering-data. As used herein, "ontological hop" refers to a logical step/space between the entity and the related engineering-data stored in the knowledge database. For example, in case of the knowledge graph database, the ontological hop refers to a relation in the knowledge graph that graphically connects the entity and the related engineering-data. The entity and the related engineering-data may be directly connected and may be indicated by one ontological hop or the entity, and the related engineering-data may be indirectly connected through other entities/sub-entities in the knowledge database. Therefore, the number of ontological hops may be based on the number of intermediate entities between the query and the related engineering-data.

The method may include determining the response to the query by consolidating the related engineering-data into the list. The method acts described herein may be implemented in a distributed computing platform. Accordingly, consolidation of the related engineering-data may enable the engineering-data from different computing devices (e.g., that implement the knowledge database) to be collated. The collation may be used to determine a confidence quotient for each of the related engineering-data in the list.

Accordingly, the method may include determining the confidence quotient for each of the related engineering-data in the list based on the number of ontological hops. As indicated in the example above, a direct connection between the entity in the query and the related engineering-data results in lower ontological hops and therefore higher confidence quotient. This similarly holds true for an indirect connection with higher ontological hops and lower confidence quotient. The engineer is made aware of how much confidence may be placed on the response generated from the knowledge database. In an embodiment, the method may further include ranking the related engineering-data within the list based on the number of ontological hops. Further, the method may include displaying the response with the confidence quotient on the GUI in accordance with the ranking.

The response to the query is displayed as the notification on the GUI. In an embodiment, the notification may be displayed as a recommendation. The present embodiments may import parameters of the recommendations automatically to design and engineer the industrial system. The recommendations may be of multiple types (e.g., a component recommendation, a configuration recommendation, a project recommendation, a usage-based recommendation). As used herein, "component recommendation" refers to recommending one or more components for the industrial system based on the response, where components of the industrial system include hardware components and software components. For example, a new software version may be recommended for a Programming Logic Controller (PLC) in the industrial system. Alternatively, a new PLC may be recommended based on the industrial system requirement.

As used herein "configuration recommendation" refers to a recommendation indicating configuration modes and tools to configure the components and the industrial system. For example, the configuration recommendation may indicate that a wrong component configuration has been engineered for a particular operation in the industrial system. Further, correct component configuration may be recommended. In an embodiment, the industrial system may be configured based on the configuration recommendation by automatically importing the configurations modes recommended.

As used herein, "project recommendation" refers to a recommendation indicating projects associated with the user input and/or the user interaction, where project configuration from the recommended project is imported to engineer the industrial system. For example, the user interaction relates to visualization of operation of the industrial system such as water pumps. The project recommendation may include recommendation of projects and describes additional keywords from the last year that the engineer has stored on the computing device used for engineering and also in the knowledge database.

As used herein, "usage-based recommendation" refers to a recommendation suggesting user actions to be performed via the GUI to engineer the industrial system. For example, the engineer is building a project for robot control for a robot (e.g., the industrial system). The actions performed by other engineers or historical actions performed by the engineer is recommended as probable user actions that may be performed to complete building of the project.

The present embodiments may be implemented in a distributed computing environment with the crawler platform implemented via one or more computing devices distributed on the cloud. Alternatively, the crawler platform may be implemented by the user interface that interacts with one or more crawlers using a message bus and via the internet. In another embodiment, the crawler platform, the user interface, and the knowledge database are hosted on the cloud with the engineering-data being stored and updated on a cloud computing platform. The user interface may be where the engineer may insert his questions and search keywords. The user interface and the crawler platform work together to interpret the user input and query the knowledge database. The results are displayed also in the user interface as simple answers or as recommendations to the further work of the engineer.

In an embodiment, the engineering-data is updated only through peer-peer verification of update actions. Further, the engineer may access the knowledge database using a subscription to the cloud computing platform, whereby the engineer is aware of best practices in an industry associated with the industrial system.

In an embodiment, the system facilitates engineering of the industrial system and may include the message bus communicatively coupled to the crawler platform, the indexing module, the knowledge database and the user interface. The message bus is configured to enable transmission of the query, the engineering-data, and the response as messages. The messages are received and transmitted in one or more message formats classified as query format, response format, recommendation format, and action format. In the embodiment, the crawler platform publishes the engineering-data, the user interface publishes the query, the indexing module subscribes to messages with the engineering-data and with the query from the message bus, and the user interface subscribes to the response with the list of engineering-data related to the query.

For example, every time one of the crawlers has determined a new entry in the multi-disciplinary platform, a "new entry message" is published to the message bus. The indexing model may subscribe the new entry message and add the new entry message to the knowledge database based on the engineering ontology. In an embodiment, a new action by the engineer causes a "new action message" that is published by the crawler. This message type is also subscribed by the indexing module.

The message bus is referred alternatively as a message-broker configured to access and update the knowledge database based on operation performed on one or more engineering software. The message bus is configured to convert the engineering-data into messages recognizable by the plurality of engineering software and the knowledge database. The message bus may be communicatively coupled to a GUI to enable access to the engineering-data via the message-broker. The engineer is facilitated by the message-bus to initiate actions in the industrial system such as a factory automation environment using the engineering software based on the messages.

In an embodiment, the message bus is communicatively coupled with the index creator or a data integration module configured to integrate the engineering-data from the plurality of engineering software into the knowledge database.

In an embodiment, the message bus is configured to receive the engineering-data from rule engines associated with the plurality of engineering software. The rule engines are configurable based on industry standards or manufacturing requirements. For example, IEC61131 standard may be used to configure the rule engines.

In another embodiment, the message bus is communicatively coupled to one or more artificial intelligence modules configured to analyze operation of the plurality of engineering software. The artificial intelligence modules include a neural network module, a reinforcement learning module, a rule-based module, or a combination thereof. The artificial intelligence modules map is configured to map the operation of the plurality of engineering software, the user input, or the combination to the engineering-data in the knowledge database. The message bus transmits the mapped engineering-data to the at least one engineering software to enable the at least one engineering software to initiate actions to engineer the industrial system. The message bus may be configured to enable multi-directional transmission of the messages from the rule engines, the GUI, and the artificial intelligence modules based on a unified message queue.

In an embodiment, the knowledge database, the GUI, the artificial intelligence modules, and the multi-disciplinary platforms are modifiably registered as subscribers and/or publishers to the message-broker.

In an embodiment, the crawler platform may be configured to dynamically generate a new crawler associated with a new platform based on the user input. Engineering-data from the new platform is updated in the knowledge database. For example, the new crawler associated with a web-based fleet management software is generated to map information from a fleet of the industrial systems. The new crawler may be generated automatically when the engineer requests (e.g., provides user input) for fleet information associated with the industrial system. Therefore, the present embodiments analyze the user input and identify the new platform that may facilitate the engineer. Further, the present embodiments automatically generate the new crawler to extract the related engineering-data and update the knowledge database.

The present embodiments enhance the capability of the engineering software tools part of the multi-disciplinary platform. The engineering software tools may provide an external programming interface that may implement the crawlers. The crawlers are triggered when the respective software is used by the engineers.

In an embodiment, the indexing module may include an index creator configured to index the engineering-data across the multi-disciplinary platforms in the knowledge database according to the engineering ontology. The index creator may be part of a knowledge graph database. Also stored in this database are the actions that the engineer has done during his work and the questions that he has answered to narrow down the results.

In another embodiment, the crawler platform may be configured to monitor user actions in the multi-disciplinary platform, where the user actions are updated in the knowledge database. For example, an automation engineer may introduce a new PLC in a document-based engineering software. When PLC is added, the knowledge database is updated. In addition, connected engineering-data in the knowledge database may also be updated. In the current example, wiring diagrams, connection lists, bills of material, cabinet diagrams, etc. impacted by the new PLC are separately created and/or updated in the knowledge database. Therefore, changes by an automation engineer who may be different from the engineer associated with the industrial system is able to provide recommendations to design and engineer the present embodiments.

The system according to present embodiments may describe a search engine that is especially designed for the engineering environment. The system consists of a lot of different, independently working crawler programs that are used to index the ongoing work of the engineer. For example, a commissioning software crawler may run in the background and is creating a keyword index over all commissioning projects that are opened by the engineer or are stored in places where the engineer has access. The system and method of the present embodiments also provide techniques to include the projects of a team of engineers. Further, the system and method of the present embodiments make the collective knowledge automatically accessible to the engineer. The more the engineers work, the more the knowledge database grows and the more knowledge is automatically accessible to the single engineer and his team.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the scope of the disclosure in its broadest form.

BRIEF DESCRIPTION OF THE DRAWINGS

FIG. 4 illustrates a method for facilitating engineering of an industrial system, according to an embodiment; and FIG. 5 illustrates a method for generating a knowledge database, according to an embodiment.

DETAILED DESCRIPTION

Figure 1:
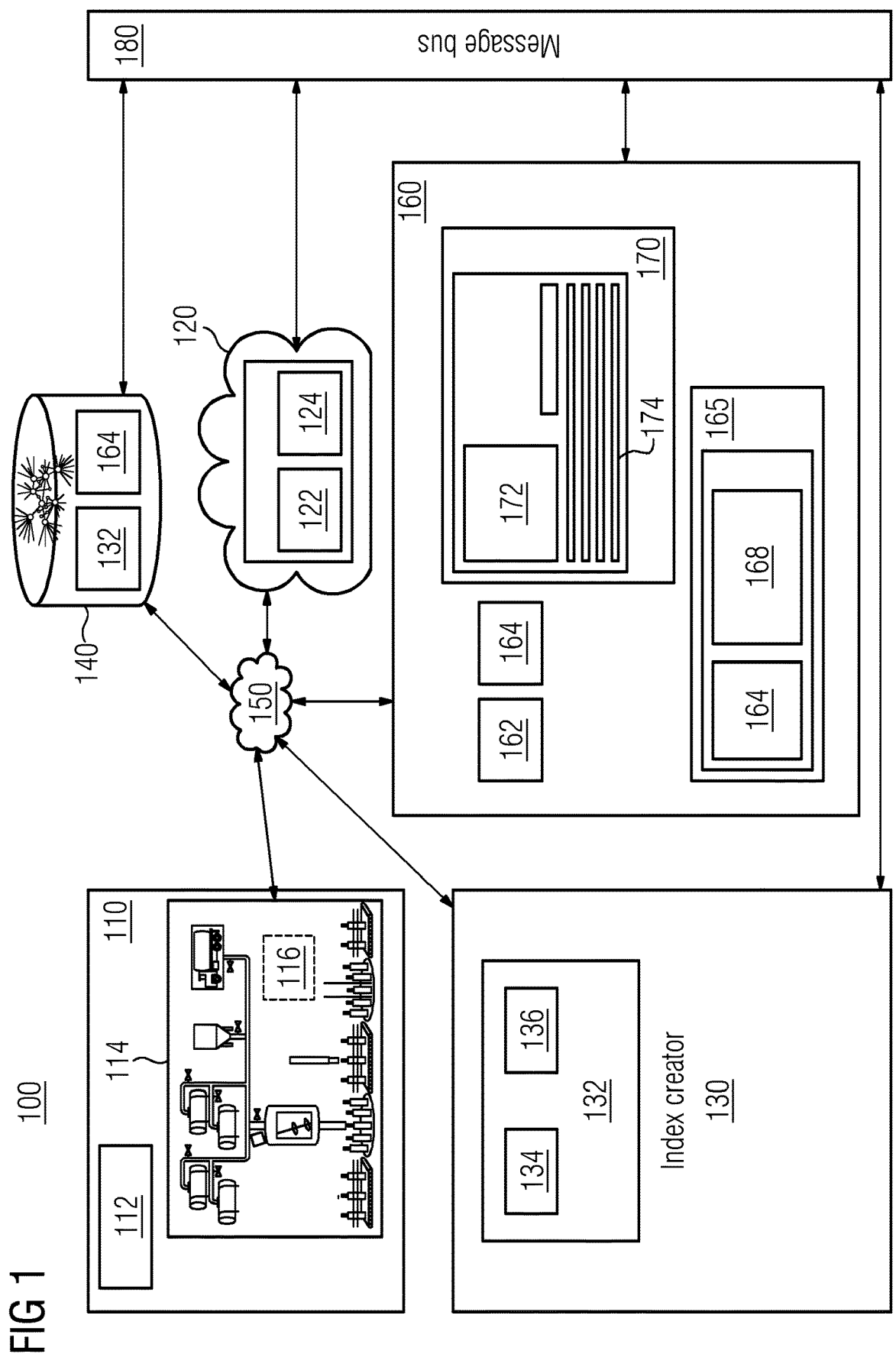
FIG. 1 illustrates a system for facilitating engineering of an industrial system, according to an embodiment.

Hereinafter, embodiments are described in detail. The various embodiments are described with reference to the drawings, where like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 illustrates a system for facilitating engineering of an industrial system, according to an embodiment. A system 100 includes a computing device 110 used by an engineer to design the industrial system.

The industrial system according to FIG. 1 is a process plant and is displayed graphically, at least in part, using a display of a computing device 110. The display illustrates a graphical user interface (GUI) 114 of a plant engineering tool used by the engineer to design the process plant. The plant engineering tool is a software module that may be deployed on the computing device 110 or hosted on a cloud computing platform 150. Further, the computing device 110 includes a crawler 112 associated with plant engineering tool. The computing device 110 is configured to generate a query based on a user input and/or a user interaction between the engineer and the GUI 114. The response to the query may be displayed on the GUI 114 as a notification 116.

The crawler 112 is configured to communicate with a crawler platform 120. The crawler platform 120 is configured to communicate to one or more crawlers (e.g., crawler 112) associated with multi-disciplinary platforms capable of performing design, engineering, commissioning, operation, and maintenance of the process plant. The crawler platform 120 includes an action manager module 122 and a new crawler module 124. The action manager module 122 is configured to monitor user actions in the multi-disciplinary platforms, where the user actions are updated in the knowledge database. The new crawler module 124 is configured to dynamically generate a new crawler associated with a new platform based on the user input, where engineering-data from the new platform is updated in the knowledge database. The crawler platform 120 may be implemented on a distributed computing environment. In an embodiment, engineering-data from crawlers associated with multiple engineering tools may be collated at the crawler platform 120. Accordingly, in an embodiment, the crawler platform 120 may act as a knowledge database.

The crawler platform 120 is configured to communicate the engineering data to an indexing device 130. The indexing device 130 is a computing device configured to index the engineering-data from the crawler platform 120 into a knowledge graph database 140.

The indexing device 130 includes an index creator 132 that further includes an action indexing module 134 and a data indexing module 136. The indexing device 130 (e.g., the index creator 132) is communicatively coupled to the crawler platform 120. The index creator is configured to collate engineering-data mined by the crawlers in the knowledge graph database 140 based on an engineering ontology of the process plant. For example, the engineering ontology for the process plant may include a structure ontology including description of components of the process plant, component topology, and spatial representation. The engineering ontology may further include material ontology and behavior ontology of the components and the materials used and manufactured in the process plant. A person skilled in the art may appreciate that the crawler platform 120 may also implement the index creator 132.

The knowledge graph database 140 is a database implemented using graph-based storage. The meaning of the engineering-data is stored alongside the engineering-data in the graph, based on the engineering ontology of the process plant. The knowledge graph database 140 may also include the index creator 132 to update the database 140. In addition, the knowledge graph database 140 may include an interface (e.g., an index reader 164) to map user inputs/user interactions from the engineer to the engineering-data. A person skilled in the art may also appreciate that the crawler platform 120 may include the knowledge graph database 140 and may thereby also implement the index reader 164.

The engineer may directly input requests in the computing device 110. In an embodiment, the engineer inputs a request onto a web-based user interface accessed via the computing device 110. The web-based user interface may be hosted on the Internet using a user interface device 160. The user interface device 160 includes a processing unit 162, a communication unit 164, a memory unit 165, and a web-based GUI 170. The GUI 170 is accessed via the computing device 110 using the Internet. The memory unit 165 includes the index reader 164 and an interface module 164 configured to generate the GUI 170.

The user interface device 160 is configured to generate a query based on a user input to the GUI 170 or a user interaction with plant engineering GUI 114. The index reader 164 maps the query to the engineering-data. In an embodiment, the GUI 170 displays 170 a notification 172 on the GUI 170 with a response to the query, consequent to at least one of the user input and the user interaction. The notification 172 includes at least suggestions to further engineering of the industrial system. The response may be a list 174 of related engineering-data mapped to the query. In an embodiment, the user interface device 160 may be configured to generate a notification 116 on the GUI 114 of the computing device 110 based on user interaction in the computing device 110.

To enable interaction and interoperability between the computing device 110, the crawlers in the crawler platform 120, the crawler platform 120, the indexing device 130, the knowledge graph database 140, and the user interface device 160, the system 100 includes a message bus 180. The message bus 180 is communicatively coupled to the crawler platform 120, the indexing device 130, the knowledge graph database 140, and the user interface device 160. The operation of the message bus 180 is described further in FIG. 3.

Figure 2:
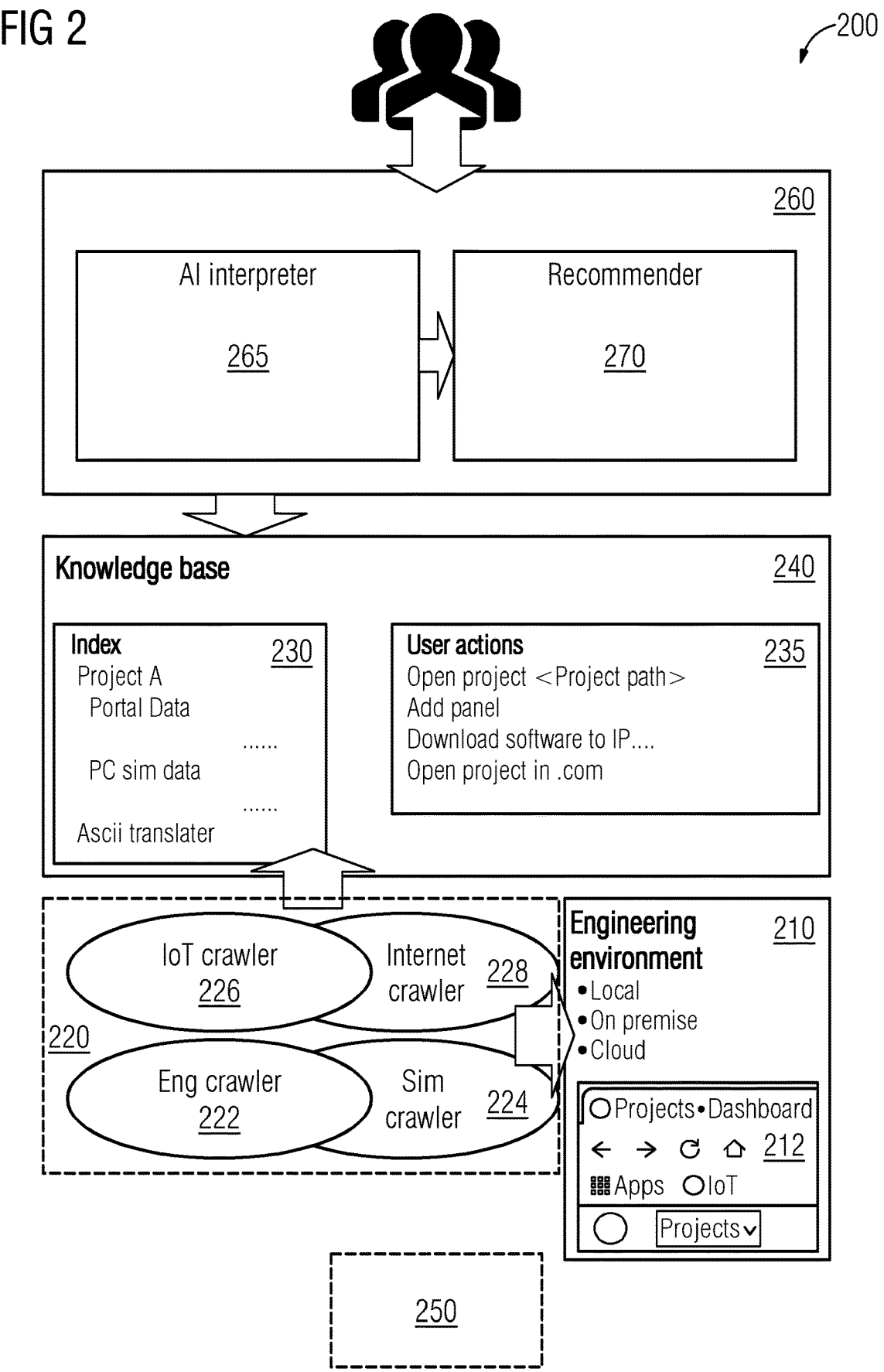
FIG. 2 illustrates operation of a system for facilitating engineering of an industrial system, according to an embodiment.

FIG. 2 illustrates operation of a system 200 for facilitating engineering of an industrial system 250, according to an embodiment. In FIG. 2, the industrial system is a programmable logic controller (PLC) 250. The PLC 250 may be configured and commissioned based on projects in an engineering environment 210. The engineering environment 210 is a multi-disciplinary platform used to build and implement projects associated with the operation of the PLC 250 in an automation system. The engineering environment 210 includes a project dashboard GUI 212 with which an engineer interacts to build the projects.

The system 200 includes a user interface module 260 that is accessed via a web-based GUI. The user interface module 260 includes an artificial intelligence (AI) interpretation module 265 and a recommendation module 270. The system 200 further includes a knowledge database 240 including an indexing module 230 and an action manager module 235.

In addition, the system 200 includes a crawler platform 220 including a plurality of crawlers 222-228 associated with design and engineering tools used in the engineering environment 210. For example, the plurality of crawlers 222-228 includes an integrated engineering crawler 222 configured to mine engineering-data from an integrated engineering software. Other crawlers include a simulation crawler 224 associated with a simulation software used to simulate the automation system. Further, an IoT crawler 226 associated with an IoT computing platform and an Internet crawler 228 may be used to crawl the engineering-data.

In operation, the indexing module 230 applies various AI techniques to index the crawled engineering-data from the engineering environment 210 in the knowledge database 240. In an embodiment, the indexing is performed according to the engineering ontology associated with the PLC 250. The engineering ontology includes all instances imported from PLC configurations. Further, the engineering ontology includes source code of the PLC 250 along with algorithms encapsulated in function blocks, functions, and subroutines. Further, the automation system configuration associated with the PLC 250 is also included in the engineering ontology. For example, the engineering ontology may be based on the IEC61131 standard or IEC61499 standard.

In an embodiment, the crawled engineering-data is received by the indexing module 230 in the form of unstructured text, then indexing module 230 uses natural language processing techniques (e.g., tokenization, entity extraction, etc.) to extract relevant key-value pairs from the unstructured text. After, the indexing module 230 applies mapping techniques for each key-value pair to identify relevant concepts from the engineering ontology and stores the engineering-data within the corresponding pages of the knowledge database 240. For example, the engineering-data is stored in ElasticSearch database or Solr database.

In case the crawled engineering data is structured (e.g., such as coming from a simulation software used in the engineering environment 210), indexing module 230 applies mapping techniques on the crawled engineering-data directly. The mapping techniques enable identification of relevant concepts from the engineering ontology, which is then used to index the engineering-data. Additionally, the indexing module 230 may apply standard indexing techniques, such as Lucene, to put the crawled engineering data within the index.

The plurality of crawlers 222-228 may monitor actions taken in the engineering environment 210 based on the changes in the associate engineering software. The actions are then updated in the knowledge database 240 by the action manager module 235. For example, the action manager module 235 is configured to identify the project and the project path and map the engineering-data in the knowledge database 240 accordingly.

In an embodiment, the engineer enters a request in the user interface module 260. The AI interpretation module 265 uses natural language processing to understand the engineer's request. For example, entity recognition techniques identify relevant entities and concepts in the request. Further, the AI interpretation module 265 identifies the type of the search query (e.g., navigational, informational, or transactional). The AI interpretation module is configured to re-phrase the engineer's request as a query. The query is then mapped to the engineering-data indexed in the knowledge database 240 using the indexing module 230. For example, if the knowledge database 240 is implemented using ElasticSearch as the storage system, then AI interpretation module 265 represents the input search request as the query DSL.

AI interpretation module 265 enhances the query by the usage of the engineering ontology. For example, the user searches for information relevant to 4DI DC24V HF, such as configuration and naming standards, and the AI interpretation module 265, based on the entity extraction results, recognizes that this is a Digital Input Module. Further, based on the engineering ontology, the AI interpretation module 265 recognizes that the AI interpretation module 265 belongs to the class of IO Modules. Hence, the query over the knowledge database 240 may be extended to include results not only for the keyword "4DI DC24V HF", but also relevant for digital input modules and IO modules. The relevance of the query results is identified by how far off the corresponding result is from the starting keyword in the query. For example, this may be how many hops away in the ontology. This feature provides that the engineer may obtain a broader insight according to his request.

In an embodiment, the no relevant engineering-data has been so far crawled for 4DI DC24V HF. Without the engineering ontology and knowledge database, the system 200 will have no results for the engineer's request. However, the system 200 has enough information for configuration and naming standards for the IO modules. By understanding that 4DI DC24V HF is an IO module, the system will be able to provide sufficient results with respect to IO modules and thereby responding to the engineer's request.

The search results are displayed using the recommendation module 270. In an embodiment, the recommendation module 270 is configured to rank the results and the related engineering-data based on a relevance score. Further, the recommendation module 270 displays the results according to the ranking and according to the type of the engineer's request (e.g., navigational, transactional, informational) and on the relevant structure from the engineering ontology.

Non-limiting examples for engineer requests (e.g., user input) are as follows:

Which function blocks in the engineering project are related to robot control?

The AI text interpretation module 265 is configured to detect a relation between the engineering project and a process simulate project (e.g., where the same signal name is used in a robot simulation and in the engineering software blocks). The response to the query is based on the engineering-data crawled by the engineering crawler 222 and the simulation crawler 224.

In which engineering projects did engineer "A" visualize the operation of water pumps last year?

The knowledge database 240 is updated with the engineering projects and describing additionally keywords from the engineer A's actions on the local PC and in code.repository.com. The request is mapped to the engineering projects in the knowledge database 240 to generate the response.

What hardware and software needed to create an emergency safety stop?

The AI interpretation module 265 analyzes the structure of the request and interconnects the engineering-data that corresponds to an emergency stop. The engineering-data is then shortlisted based on its relevance to the PLC 250.

Are there open source software libraries for the control of signal towers?

The AI interpretation module 265 initiates a query in the knowledge database 240 to identify project that was created by one of the engineering tool crawlers 222-228. Accordingly, the response is determined and displayed. If the AI interpretation module 265 does not find an entry of a project in the knowledge database 240, the AI interpretation module 265 delegates the query to an internet search.

Figure 3:
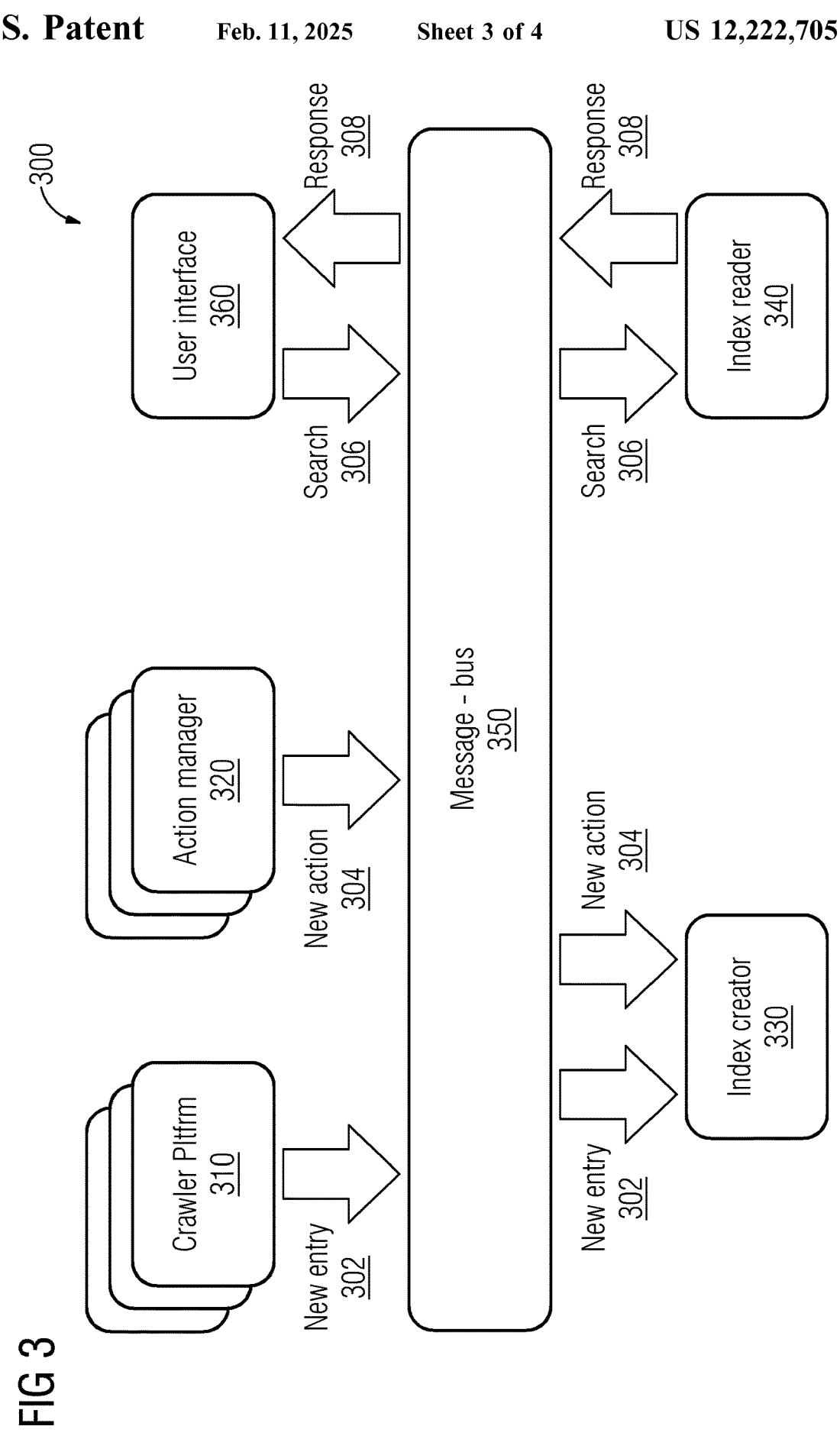
FIG. 3 illustrates a system for facilitating engineering of an industrial system according to an embodiment.

FIG. 3 illustrates a system 300 for facilitating engineering of an industrial system according to an embodiment. The system 300 includes a crawler platform 310, an action manager 320, an index creator 330, an index reader 340, and a user interface 360. The system 300 further includes a message bus 350.

The operation of the crawler platform 310, the action manager 320, the index creator 330, the index reader 340, and the user interface 360 is comparable with the associated modules in FIG. 1 and FIG. 2. For example, the indexing module 230 refers to the index creator 330 and the index reader 340. The action manager 320 is comparable to the action manager module 122.

The message bus 350 is communicatively coupled to the crawler platform 310, the action manager 320, the index creator 330, the index reader 340, and the user interface 360. The message bus 350 is configured to enable transmission of the query, the engineering-data, and the response as messages. The crawler platform 310 publishes the engineering-data. For example, the engineering data is published as a "new entry message" 302. The action manager 320 publishes user actions performed in the multi-disciplinary platforms used to design and engineer the industrial system. For example, a user action is published as a "new action message" 304.

The index creator 330 subscribes to the new entry messages 302 and the new action messages 304. The index creator 330 indexes the messages 302 and 304 in the knowledge database according to the engineering ontology of the industrial system.

When the engineer inputs a request or interacts with an engineering software, the user interface 360 is configured to generate a query. Accordingly, the user interface publishes the query as a "search message" 306. The index reader 340 subscribes to the search messages 306 and publishes the engineering-data related to the query as "match message" 308 or "response message" 308. The user interface subscribes to the response message 308 including a list of engineering-data related to the query.

FIG. 4 illustrates a method 400 for facilitating engineering of an industrial system, according to an embodiment. To facilitate engineering of the industrial system, a knowledge database with engineering data associated with the industrial system may be generated.

FIG. 5 illustrates a method 500 for generating a knowledge database, according to an embodiment. At act 510, the engineering-data mined by one or more crawlers is indexed in the knowledge database. The indexing may be based on key-value pairs between entities identified in the engineering-data and the engineering-data itself. The indexing may also be based on the engineering ontology of the industrial system. Act 510 may also include crawling or mining the multi-disciplinary platforms for the engineering-data and user actions performed on the multi-disciplinary platforms.

At act 520, key-value pairs for the engineering-data and the user actions are generated. In an embodiment, the key-value pairs are generated by analyzing unstructured data in the engineering-data and the user actions. The analysis includes extracting the entities referenced in the user actions and by tokenizing text in the unstructured data.

At act 530, the indexed engineering-data is updated in the knowledge database based on the user actions.

The method 400 for facilitating engineering of the industrial system. The method 400 begins at act 410 by generating a query based on a user input and/or a user interaction with a graphical user interface (GUI) configured to enable engineering of the industrial system. Act 410 further includes recognizing at least one entity in the industrial system associated with the user interaction based on parameters of the industrial system impacted/modified by the user interaction. The entity includes hardware components and/or software components of the industrial system. Act 410 may further include recognizing the entity in the industrial system associated with the user input based on analysis and synthesis of content of the user input, where the content includes text, image, audio, video, gesture, and a combination thereof.

Act 420 includes mapping the query to the knowledge database including the engineering-data generated across multi-disciplinary platforms associated with design, engineering, commissioning, operation, and/or maintenance of the industrial system. The engineering-data is made available by one or more crawlers associated with the multi-disciplinary platforms, and the engineering-data is indexed in the knowledge database based on the engineering ontology of the industrial system as described in the method 500.

Act 420 may further include determining from the knowledge database the engineering-data related to the entity referenced in the query and determining a distance between the related engineering-data and the query based on number of ontological hops between the query and the related engineering-data.

In an embodiment, the act 420 may also include determining the response to the query by consolidating the related engineering-data into a list and determining a confidence quotient for each of the related engineering-data in the list based on the number of ontological hops. Further, the act 420 may include ranking the related engineering-data within the list based on the number of ontological hops.

Act 430 includes displaying a notification on the GUI with a response the query, consequent to the user input and/or the user interaction. The response includes the list of engineering-data related to the query and the confidence quotient. Further, act 430 includes displaying the notification including one or more recommendations to further engineering of the industrial system. For example, the recommendation includes component recommendation for the industrial system based on the response. The recommendation may also include configuration recommendation indicating configuration modes and tools to configure the components and the industrial system. Further, the recommendation may include project recommendation indicating projects associated with the user input, the user interaction, or a combination thereof. The project configuration from the recommended project is imported to engineer the industrial system. Further, the recommendation includes usage-based recommendation suggesting user actions to be performed via the GUI to engineer the industrial system.

At act 440, the engineer incorporates the recommendation whereby the industrial system is configured based on the notification. For example, if a project recommendation is provided, configurations for the industrial system may be automatically imported and affect designing the industrial system.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device), propagation mediums in and of themselves as signal carriers are not included in the definition of physical computer-readable medium, which, Physical computer-readable medium includes a semiconductor or solid state memory, magnetic tape, a removable computer diskette, random access memory (RAM), a read only memory (ROM), a rigid magnetic disk, and optical disk such as compact disk read-only memory (CD-ROM), compact disk read/write, and DVD. Both processing units and program code for implementing each aspect of the technology may be centralized or distributed (or a combination thereof) as known to those skilled in the art. Additionally, while the current disclosure describes the indexing module and the crawler platform as independent components, the modules may be a software component and may be realized within a distributed control system or an engineering software suite. Additionally, in an embodiment, one or more parts of the engineering module may be realized within the technical system.

While the present disclosure has been described in detail with reference to certain embodiments, it should be appreciated that the present disclosure is not limited to those embodiments. In view of the present disclosure, many modifications and variations would be present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be apply to system/device claims.

The elements and features recited in the append ed claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of facilitating engineering of an industrial system, the method comprising:
generating a query based on a user input, a user interaction with a graphical user interface (GUI), or the user input and the user interaction configured to enable engineering of the industrial system;
mapping the query to a knowledge database comprising engineering-data generated across multi-disciplinary platforms associated with design, engineering, commissioning, operation, maintenance, or any combination thereof of the industrial system, wherein the engineering-data is made available by one or more crawlers associated with the multi-disciplinary platforms, and wherein the engineering-data is indexed in the knowledge database based on an engineering ontology of the industrial system; and
displaying a notification on the GUI with a response to the query, consequent to the user input, the user interaction, or the user input and the user interaction, wherein the response comprises at least a list of engineering-data related to the query, wherein the notification comprises at least a recommendation to further engineering of the industrial system,
wherein the knowledge database is a knowledge graph database generated by indexing the engineering-data based on key-value pairs and the engineering ontology,
wherein the key-value pairs are generated between entities identified in the engineering-data,
wherein the key-value pairs are generated for the engineering-data and the user actions by:
analyzing unstructured data in the engineering-data and the user actions by extracting the entities referenced in the user actions and by tokenizing text in the unstructured data,
wherein the user actions are monitored and indexed by the crawlers,
wherein the response further comprises a confidence quotient for each of the related engineering-data in the list based on a number of ontological hops, and
wherein the related engineering-data is ranked within the list based on a number of ontological hops.

2. The method of claim 1, wherein generating the query comprises:
recognizing at least one entity in the industrial system associated with the user interaction based on parameters of the industrial system associated with the user interaction, wherein the at least one entity comprises one or more hardware components, software components, or hardware components and software components of the industrial system; and
recognizing the at least one entity in the industrial system associated with the user input based on analysis and synthesis of content of the user input,
wherein the content comprises text, image, audio, video, gesture, or any combination thereof.

3. The method of claim 1, wherein mapping the query to the engineering-data comprises:
determining from the knowledge database the engineering-data related to the entity referenced in the query; and
determining a distance between the related engineering-data and the query based on the number of ontological hops between the query and the related engineering-data.

4. The method of claim 1, wherein the recommendation to further engineering of the industrial system comprises:
a component recommendation for the industrial system based on the response, wherein components of the industrial system comprise hardware components and software components;
a configuration recommendation indicating configuration modes and tools to configure the components and the industrial system;
a project recommendation indicating projects associated with the user input or the user interaction, wherein a project configuration from the recommended project is imported to engineer the industrial system; and
a usage-based recommendation suggesting user actions to be performed via the GUI to engineer the industrial system.

5. A system for facilitating engineering of an industrial system, the system comprising:
a crawler platform configured to:
communicate to one or more crawlers associated with multi-disciplinary platforms capable of performing design, engineering, commissioning, operation, and maintenance of the industrial system; and
monitor user actions in the multi-disciplinary platforms, wherein the user actions are updated in the knowledge database;

an indexing module communicatively coupled to the crawler platform and configured to collate engineering-data mined by the crawlers in a knowledge database, wherein the indexing module is further configured to extract relevant key-value pairs from unstructured data of the engineering-data, the indexing module comprising an index reader configured to map a query to the knowledge database comprising the engineering-data generated across the multi-disciplinary platforms, which are associated with design, engineering, commissioning, operation, maintenance, or any combination thereof of the industrial system, based on an engineering ontology of the industrial system; and a user interface module configured to:
 generate the query based on a user input, a user interaction with a graphical user interface (GUI), or the user input and the user interaction configured to enable engineering of the industrial system; and
 subscribe to a response to the query with a list of engineering-data related to the query, wherein the GUI displays a notification on the GUI with the response to the query, consequent to the user input, the user interaction, or the user input and the user interaction, wherein the notification comprises at least suggestions to further engineering of the industrial system, wherein the knowledge database is implemented as a knowledge graph database based on an index of the engineering-data based on key-value pairs and the engineering ontology, wherein the knowledge database is a knowledge graph database generated by indexing the engineering-data based on key-value pairs and the engineering ontology, wherein the key-value pairs are generated between entities identified in the engineering-data, and for the engineering-data and the user actions, the generation of the key-value pairs comprising analysis of unstructured data in the engineering-data and the user actions by extraction of the entities referenced in the user actions and by tokenization of text in the unstructured data, wherein the response comprises a confidence quotient for each of the related engineering-data in the list based on a number of ontological hops, and wherein the related engineering-data is ranked within the list based on a number of ontological hops.

6. The system of claim 5, further comprising:

a message bus communicatively coupled to the crawler platform, the indexing module, the knowledge database, and the user interface, wherein the message bus is configured to enable transmission of the query, the engineering-data, and the response as messages, wherein the crawler platform is configured to publish the engineering-data, wherein the user interface is configured to publish the query, and wherein the indexing module is configured to subscribe to messages with the engineering-data and with the query from the message bus.

7. The system of claim 6, wherein the crawler platform is configured to dynamically generate a new crawler associated with a new platform based on the user input, and wherein engineering-data from the new platform is updated in the knowledge database.

8. The system of claim 5, wherein the indexing module comprises an index creator configured to index the engineering-data across the multi-disciplinary platforms in the knowledge database according to the engineering ontology.

9. A computer program product comprising computer readable code-executable by a processor to perform facilitating engineering of an industrial system, the facilitating of the engineering of the industrial system comprising:

generating a query based on a user input, a user interaction with a graphical user interface (GUI), or the user input and the user interaction configured to enable engineering of the industrial system;

mapping the query to a knowledge database comprising engineering-data generated across multi-disciplinary platforms associated with design, engineering, commissioning, operation, maintenance, or any combination thereof of the industrial system, wherein the engineering-data is made available by one or more crawlers associated with the multi-disciplinary platforms, and wherein the engineering-data is indexed in the knowledge database based on an engineering ontology of the industrial system; and displaying a notification on the GUI with a response to the query, consequent to the user input, the user interaction, or the user input and the user interaction, wherein the response comprises at least a list of engineering-data related to the query, wherein the notification comprises at least a recommendation to further engineering of the industrial system, wherein the knowledge database is a knowledge graph database generated by indexing the engineering-data based on key-value pairs and the engineering ontology, wherein the key-value pairs are generated between entities identified in the engineering-data, wherein the key-value pairs are generated for the engineering-data and the user actions by:
 analyzing unstructured data in the engineering-data and the user actions by extracting the entities referenced in the user actions and by tokenizing text in the unstructured data, wherein the user actions are monitored and indexed by the crawlers, wherein the response further comprises a confidence quotient for each of the related engineering-data in the list based on a number of ontological hops, and wherein the related engineering-data is ranked within the list based on a number of ontological hops.

10. The computer program product of claim 9, wherein generating the query comprises:

recognizing at least one entity in the industrial system associated with the user interaction based on parameters of the industrial system associated with the user interaction, wherein the at least one entity comprises one or more hardware components, software components, or hardware components and software components of the industrial system; and recognizing the at least one entity in the industrial system associated with the user input based on analysis and synthesis of content of the user input, wherein the content comprises text, image, audio, video, gesture, or any combination thereof.

11. The computer program product of claim 10, wherein mapping the query to the engineering-data comprises:

determining from the knowledge database the engineering-data related to the entity referenced in the query; and determining a distance between the related engineering-data and the query based on the number of ontological hops between the query and the related engineering-data.

12. The computer program product of claim 9, wherein the recommendation to further engineering of the industrial system comprises:
   a component recommendation for the industrial system based on the response, wherein components of the industrial system comprise hardware components and software components;
   a configuration recommendation indicating configuration modes and tools to configure the components and the industrial system;
   a project recommendation indicating projects associated with the user input or the user interaction, wherein a project configuration from the recommended project is imported to engineer the industrial system; and
   a usage-based recommendation suggesting user actions to be performed via the GUI to engineer the industrial system.

13. The method of claim 2, wherein mapping the query to the engineering-data comprises:
   determining from the knowledge database the engineering-data related to the entity referenced in the query; and
   determining a distance between the related engineering-data and the query based on the number of ontological hops between the query and the related engineering-data.

14. A system for facilitating engineering of an industrial system, the system comprising:
   a crawler platform configured to communicate to one or more crawlers associated with multi-disciplinary platforms capable of performing design, engineering, commissioning, operation, and maintenance of the industrial system;
   an indexing module communicatively coupled to the crawler platform and configured to collate engineering-data mined by the crawlers in a knowledge database, wherein the indexing module is further configured to extract relevant key-value pairs from unstructured data of the engineering-data, the indexing module comprising an index reader configured to map a query to the engineering-data generated across the multi-disciplinary platforms based on an engineering ontology of the industrial system;
   a user interface module configured to generate the query based on a user input, a user interaction with a graphical user interface (GUI), or the user input and the user interaction configured to enable engineering of the industrial system, wherein the GUI displays a notification on the GUI with a response to the query, consequent to the user input, the user interaction, or the user input and the user interaction, wherein the notification comprises at least suggestions to further engineering of the industrial system; and
   a message bus communicatively coupled to the crawler platform, the indexing module, the knowledge database, and the user interface,
   wherein the message bus is configured to enable transmission of the query, the engineering-data, and the response as messages,
   wherein the crawler platform is configured to publish the engineering-data,
   wherein the user interface is configured to publish the query,
   wherein the indexing module is configured to subscribe to messages with the engineering-data and with the query from the message bus,
   wherein the user interface is configured to subscribe to the response with a list of engineering-data related to the query,
   wherein the crawler platform is configured to dynamically generate a new crawler associated with a new platform based on the user input,
   wherein engineering-data from the new platform is updated in the knowledge database,
   wherein the crawler platform is configured to monitor user actions in the multi-disciplinary platforms,
   wherein the user actions are updated in the knowledge database, and
   wherein the indexing module comprises an index creator configured to index the engineering-data across the multi-disciplinary platforms in the knowledge database according to the engineering ontology.

\* \* \* \* \*